(12) United States Patent
Sreeramaneni et al.

(10) Patent No.: US 10,491,430 B2
(45) Date of Patent: Nov. 26, 2019

(54) MEMORY DECISION FEEDBACK EQUALIZER TESTING

(71) Applicant: Micron Technology, Inc., Boise, ID (US)

(72) Inventors: Raghukiran Sreeramaneni, Frisco, TX (US); Jennifer E. Taylor, Boise, ID (US); Liang Liu, Xuhui District (CN)

(73) Assignee: Micron Technology, Inc., Boise, ID (US)

( * ) Notice: Subject to any disclaimer, the term of this patent is extended or adjusted under 35 U.S.C. 154(b) by 16 days.

(21) Appl. No.: 15/714,818

(22) Filed: Sep. 25, 2017

(65) Prior Publication Data

US 2019/0097846 A1 Mar. 28, 2019

(51) Int. Cl.
*H04L 25/03* (2006.01)

(52) U.S. Cl.
CPC .. *H04L 25/03057* (2013.01); *H04L 25/03146* (2013.01)

(58) Field of Classification Search
CPC ..... H04L 25/03057; H04L 1/20; H04L 1/241; H04L 1/242; H04L 1/244; H04L 5/006; H04L 7/033; H04L 25/03146; G01R 31/31709; G01R 31/31711; H04J 11/0023
See application file for complete search history.

(56) References Cited

U.S. PATENT DOCUMENTS

| | | | | |
|---|---|---|---|---|
| 5,276,648 A | * | 1/1994 | Yanagisawa | G11C 11/4085 365/177 |
| 5,612,919 A | * | 3/1997 | Arimoto | G11C 29/04 365/149 |
| 5,615,157 A | * | 3/1997 | Nakashima | G11C 29/02 365/201 |
| 6,195,771 B1 | * | 2/2001 | Tanabe | G11C 29/56 714/718 |
| 6,298,458 B1 | * | 10/2001 | Cranford, Jr. | H04L 43/50 370/245 |
| 6,460,152 B1 | * | 10/2002 | Demidov | G01R 31/31935 365/201 |
| 6,574,763 B1 | * | 6/2003 | Bertin | G01R 31/287 324/750.05 |

(Continued)

FOREIGN PATENT DOCUMENTS

| | | | | |
|---|---|---|---|---|
| GB | 2507001 A | * | 4/2014 | G11C 11/412 |
| WO | WO 2008076912 A1 | * | 6/2008 | G11C 29/1201 |
| WO | WO 2014100136 A1 | * | 6/2014 | G11C 29/1201 |

OTHER PUBLICATIONS

Decision feedback Equalizer design for Mobile Transceivers—by C. Thankkar, EECS-2012-190.*

(Continued)

*Primary Examiner* — Berhanu Tadese
(74) *Attorney, Agent, or Firm* — Fletcher Yoder, P.C.

(57) ABSTRACT

A device includes one or more memory banks configured to store data. The device also includes a data receiver configured to receive distorted input data as part of a data stream, apply a correction factor to the distorted input data to offset inter-symbol interference from the data stream on the distorted input data, and generate the data by applying the correction factor to the distorted data. The device further includes a test circuit internal to the device, wherein the test circuit is configured to generate the data stream.

34 Claims, 7 Drawing Sheets

(56) References Cited

U.S. PATENT DOCUMENTS

| | | | | |
|---|---|---|---|---|
| 6,769,081 B1* | 7/2004 | Parulkar | G11C 29/16 | 714/733 |
| 6,816,991 B2* | 11/2004 | Sanghani | G11C 7/1051 | 714/724 |
| 6,950,352 B1* | 9/2005 | Jung | G11C 7/18 | 365/200 |
| 7,176,721 B2* | 2/2007 | Ho | H04L 25/028 | 326/26 |
| 7,336,749 B2* | 2/2008 | Garlepp | H04L 1/20 | 375/355 |
| 7,583,753 B2* | 9/2009 | Okamura | H04L 1/205 | 326/22 |
| 7,613,393 B2* | 11/2009 | Aronson | H04B 10/40 | 398/16 |
| 7,627,029 B2* | 12/2009 | Ho | H04L 25/03006 | 375/229 |
| 7,673,209 B2* | 3/2010 | Park | G11C 29/10 | 714/738 |
| 7,715,471 B2* | 5/2010 | Werner | H04L 25/028 | 375/220 |
| 7,936,812 B2* | 5/2011 | Hollis | H03K 3/356113 | 375/233 |
| 7,994,814 B1* | 8/2011 | Flynn | H03K 19/01750 | 326/26 |
| 8,275,030 B2* | 9/2012 | Werner | H04L 25/028 | 375/232 |
| 8,510,073 B2* | 8/2013 | Dasnurkar | H03M 1/109 | 702/117 |
| 8,989,329 B2* | 3/2015 | Hammad | H04L 7/0079 | 375/355 |
| 9,014,254 B2* | 4/2015 | Atwood | H04L 1/244 | 375/233 |
| 9,088,399 B1* | 7/2015 | Poon | H04L 1/243 | |
| 9,231,635 B2* | 1/2016 | Wall | G01R 31/31708 | |
| 9,542,991 B1* | 1/2017 | Xie | G11C 11/4076 | |
| 9,762,237 B1* | 9/2017 | Isakanian | H03K 19/0005 | |
| 9,767,919 B1* | 9/2017 | He | G11C 29/38 | |
| 9,860,088 B1* | 1/2018 | DeSimone | H04L 25/03057 | |
| 2001/0034866 A1* | 10/2001 | Barry | G01R 31/31813 | 714/734 |
| 2003/0016770 A1* | 1/2003 | Trans | H04B 1/00 | 375/346 |
| 2004/0186688 A1* | 9/2004 | Nejedlo | G06F 11/27 | 702/186 |
| 2004/0234014 A1* | 11/2004 | Chen | H04L 1/20 | 375/350 |
| 2005/0096876 A1* | 5/2005 | Jang | G11C 29/48 | 702/185 |
| 2005/0157780 A1* | 7/2005 | Werner | H04L 25/028 | 375/232 |
| 2005/0157781 A1* | 7/2005 | Ho | H04L 25/028 | 375/233 |
| 2006/0034358 A1* | 2/2006 | Okamura | H04L 1/205 | 375/219 |
| 2006/0133166 A1* | 6/2006 | Kikutake | G06F 11/1032 | 365/201 |
| 2006/0227912 A1* | 10/2006 | Leibowitz | G01R 31/31709 | 375/350 |
| 2007/0002845 A1* | 1/2007 | Kelly | H04L 7/0091 | 370/354 |
| 2007/0223571 A1* | 9/2007 | Viss | H04L 25/03057 | 375/233 |
| 2008/0192640 A1* | 8/2008 | Simpson | H04L 1/241 | 370/249 |
| 2008/0192859 A1* | 8/2008 | Foley | H04L 25/08 | 375/296 |
| 2008/0192860 A1* | 8/2008 | Harwood | H04L 25/03343 | 375/296 |
| 2008/0195363 A1* | 8/2008 | Lytollis | G06F 17/5036 | 703/3 |
| 2008/0219390 A1* | 9/2008 | Simpson | H04L 7/0062 | 375/355 |
| 2008/0304557 A1* | 12/2008 | Hollis | H04L 25/03885 | 375/231 |
| 2009/0010320 A1* | 1/2009 | Hollis | H03K 3/356113 | 375/232 |
| 2009/0092180 A1* | 4/2009 | Hollis | H04L 25/03019 | 375/232 |
| 2009/0102692 A1* | 4/2009 | Pickering | H03K 5/135 | 341/155 |
| 2009/0119554 A1* | 5/2009 | Dai | H04L 25/0264 | 714/717 |
| 2009/0290651 A1* | 11/2009 | Okamura | H04L 1/205 | 375/257 |
| 2010/0251040 A1* | 9/2010 | Zerbe | G01R 31/31703 | 714/715 |
| 2011/0103459 A1* | 5/2011 | Esmailian | H04L 25/03146 | 375/233 |
| 2012/0072784 A1* | 3/2012 | Li | G06F 11/267 | 714/704 |
| 2013/0145212 A1* | 6/2013 | Hsu | G06F 11/2733 | 714/27 |
| 2014/0258780 A1* | 9/2014 | Eyres | G11C 29/16 | 714/30 |
| 2014/0376603 A1* | 12/2014 | Atwood | H04L 1/244 | 375/224 |
| 2015/0067292 A1* | 3/2015 | Grunzke | G06F 13/1694 | 711/170 |
| 2015/0131707 A1* | 5/2015 | Atwood | H04L 1/244 | 375/224 |
| 2016/0011232 A1* | 1/2016 | Marques Martins | G01R 31/31905 | 324/754.03 |
| 2017/0371760 A1* | 12/2017 | Kuster | H04L 67/12 | |
| 2019/0097846 A1* | 3/2019 | Sreeramaneni | H04L 25/03146 | |

OTHER PUBLICATIONS

PCT Application No. PCT/US2018/039805, International Search Report and Written Opinion, dated Oct. 23, 2018, 13 pages.

* cited by examiner

MEMORY DECISION FEEDBACK EQUALIZER TESTING

BACKGROUND

Field of the Invention

Embodiments of the present disclosure relate generally to the field of semiconductor memory devices. More specifically, embodiments of the present disclosure relate to testing of a decision feedback equalizer (DFE) circuit of a semiconductor memory device.

Description of the Related Art

The operational rate of memory devices, including the data rate of a memory device, has been increasing over time. As a side effect of the increase in speed of a memory device, data errors due to distortion may increase. For example, inter-symbol interference between transmitted data whereby previously received data influences the currently received data may occur (e.g., previously received data affects and interferes with subsequently received data). One manner to correct for this interference is through the use of a decision feedback equalizer (DFE) circuit, which may be programmed to offset (i.e., undo, mitigate, or offset) the effect of the channel on the transmitted data.

Additionally, testing of memory devices continues to be important. However, conventional memory testing devices and techniques may not adequately test the functionality of a DFE circuit, thus reducing the overall efficiency and operability of the memory device if the DFE circuit is defective or otherwise not operating correctly.

BRIEF DESCRIPTION OF THE DRAWINGS

Various aspects of this disclosure may better be understood upon reading the following detailed description and upon reference to the drawings in which.

DETAILED DESCRIPTION

Figure 1:
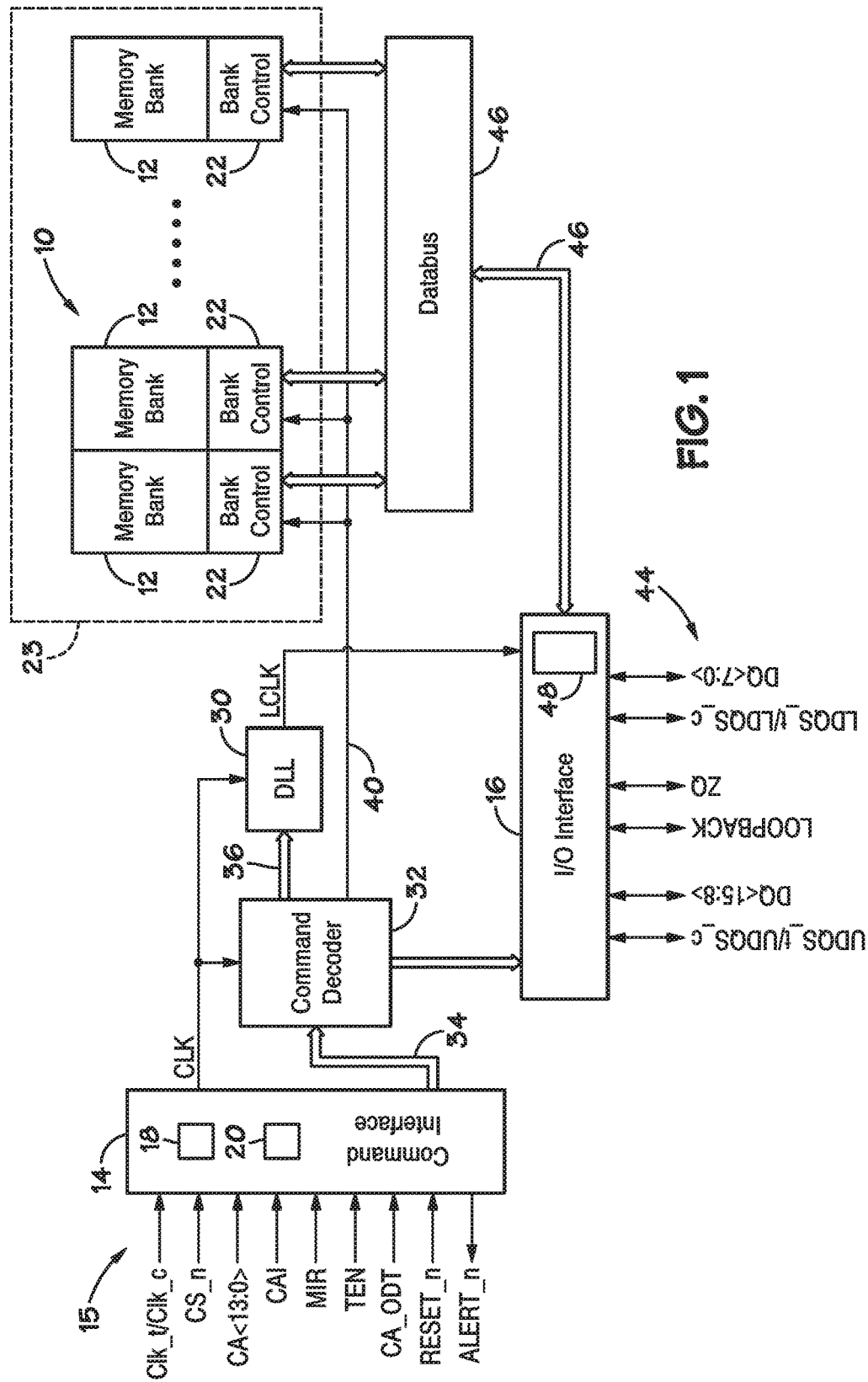
FIG. 1 is a simplified block diagram illustrating certain features of a memory device, according to an embodiment of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Testing of a decision feedback equalizer (DFE) of a memory device and/or its functionality may be valuable, for example, to confirm that any offset values being generated by, the DFE and applied to received data of the memory device correctly compensate for distortions in the received data to insure that accurate values are being stored in the memory of the memory device. In some embodiments, a Built-In-Self-Test (BIST) circuit may be utilized to allow for on-die testing of the DFE. The memory device may operate to provide a stimulus to aid in the testing of the DFE circuitry on-die. For example, various combinations of pull-up and pull-down transmitter leg strengths and numbers may utilized to control data input/output pad (DQ pad) voltage with very fine resolution. This operation may allow for the generation of a waveform (e.g., input pattern in place of an input from a DQ pad) having a multi-level input voltage signal (Vin) that can mimic channel distortion. With this input pattern, a write operation with chosen DFE tap settings can be performed as part of a test mode operation and verification that the on-die receiver is able to read the data (pre-distorted data pattern) correctly may be undertaken.

In some embodiments, on-die circuitry that can generate a bit-stream (e.g., input stimulus) may be implemented and a look up table to set certain number of pull-up and/or pull-down legs to be turned on in the DQ output driver may be utilized. The memory device may be placed in a DFE-BIST mode, whereby a write to the array (e.g., continuous burst write) may be undertaken while the DQ output driver is generating the input stimulus. Thereafter, the burst write may be halted and a verification of the bit-stream written to the array as matching expect data may be undertaken.

Additionally, a system and technique to verify correct DFE functionality of a memory device in simulation and/or back-end testing may be utilized. In some embodiments, a simulation input deck may be utilized to mimic inter-symbol interference (ISI) introduced by a system channel. Through generation and application of patterns tuned to the memory device to be tested, the DFE circuit can be verified to correctly restore the original input sequence. Any choice of post-cursor values can be used for any number of taps used in conjunction with DFE circuitry of a memory device, thereby enabling accurate simulation verification for an entire range of DFE correction. A similar method can be applied in back-end tester to verify DFE functionality. A data eye can be generated for a clean input, and a second data eye can be generated with varying Vin high levels (e.g., input voltage levels associated with a high data input, "1") and Vin low levels (e.g., input voltage levels associated with a low data input, "0") as input data values to mimic system ISI. The DFE circuit can be verified to function correctly when the first and second data eyes match. This simulation and testing method may be applied to any type of input receiver using DFE correction.

Turning now to the figures, FIG. 1 is a simplified block diagram illustrating certain features of a memory device 10. Specifically, the block diagram of FIG. 1 is a functional block diagram illustrating certain functionality of the memory device 10. In accordance with one embodiment, the memory device 10 may be a double data rate type five synchronous dynamic random access memory (DDR5 SDRAM) device. Various features of DDR5 SDRAM allow for reduced power consumption, more bandwidth and more storage capacity compared to prior generations of DDR SDRAM.

The memory device 10, may include a number of memory banks 12. The memory banks 12 may be DDR5 SDRAM memory banks, for instance. The memory banks 12 may be provided on one or more chips (e.g., SDRAM chips) that are arranged on dual inline memory modules (DIMMS). Each DIMM may include a number of SDRAM memory chips (e.g., x8 or x16 memory chips), as will be appreciated. Each SDRAM memory chip may include one or more memory banks 12. The memory device 10 represents a portion of a single memory chip (e.g., SDRAM chip) having a number of memory banks 12. For DDR5, the memory banks 12 may be further arranged to form bank groups. For instance, for an 8 gigabit (Gb) DDR5 SDRAM, the memory chip may include 16 memory banks 12, arranged into 8 bank groups, each bank group including 2 memory banks. For a 16 Gb DDR5 SDRAM, the memory chip may include 32 memory banks 12, arranged into 8 bank groups, each bank group including 4 memory banks, for instance. Various other configurations, organization and sizes of the memory banks 12 on the memory device 10 may be utilized depending on the application and design of the overall system.

The memory device 10 may include a command interface 14 and an input/output (I/O) interface 16 configured to exchange (e.g., receive and transmit) signals with external devices. The command interface 14 is configured to provide a number of signals (e.g., signals 15) from an external device (not shown), such as a processor or controller. The processor or controller may provide various signals 15 to the memory device 10 to facilitate the transmission and receipt of data to be written to or read from the memory device 10.

As will be appreciated, the command interface 14 may include a number of circuits, such as a clock input circuit 18 and a command address input circuit 20, for instance, to ensure proper handling of the signals 15. The command interface 14 may receive one or more clock signals from an external device. Generally, double data rate (DDR) memory utilizes a differential pair of system clock signals, referred to herein as the true clock signal (Clk_t/) and the complementary clock signal (Clk_c). The positive clock edge for DDR refers to the point where the rising true clock signal Clk_t/ crosses the falling complementary clock signal Clk_c, while the negative clock edge indicates that transition of the falling true clock signal Clk_t and the rising of the complementary clock signal Clk_c. Commands (e.g., read command, write command, etc.) are typically entered on the positive edges of the clock signal and data is transmitted or received on both the positive and negative clock edges.

The clock input circuit 18 receives the true clock signal (Clk_t/) and the complementary clock signal (Clk_c) and generates an internal clock signal CLK. The internal clock signal CLK is supplied to an internal clock generator 30, such as a delay locked loop (DLL) circuit. The internal clock generator 30 generates a phase controlled internal clock signal LCLK based on the received internal clock signal CLK. The phase controlled internal clock signal LCLK is supplied to the I/O interface 16, for instance, and is used as a timing signal for determining an output timing of read data.

The internal clock signal CLK may also be provided to various other components within the memory device 10 and may be used to generate various additional internal clock signals. For instance, the internal clock signal CLK may be provided to a command decoder 32. The command decoder 32 may receive command signals from the command bus 34 and may decode the command signals to provide various internal commands. For instance, the command decoder 32 may provide command signals to the internal clock generator 30 over the bus 36 to coordinate generation of the phase controlled internal clock signal LCLK. The phase controlled internal clock signal LCLK may be used to clock data through the I/O interface 16, for instance.

Further, the command decoder 32 may decode commands, such as read commands, write commands, mode-register set commands, activate commands, etc., and provide access to a particular memory bank 12 corresponding to the command, via the bus path 40. As will be appreciated, the memory device 10 may include various other decoders, such as row decoders and column decoders, to facilitate access to the memory banks 12. In one embodiment, each memory bank 12 includes a bank control block 22 which provides the necessary decoding (e.g., row decoder and column decoder), as well as other features, such as timing control and data control, to facilitate the execution of commands to and from the memory banks 12. Collectively, the memory banks 12 and the bank control blocks 22 may be referred to as a memory array 23.

The memory device 10 executes operations, such as read commands and write commands, based on the command/address signals received from an external device, such as a processor. In one embodiment, the command/address bus may be a 14-bit bus to accommodate the command/address signals (CA<13:0>). The command/address signals are clocked to the command interface 14 using the clock signals (Clk_t/and Clk_c). The command interface may include a command address input circuit 20 which is configured to receive and transmit the commands to provide access to the memory banks 12, through the command decoder 32, for instance. In addition, the command interface 14 may receive a chip select signal (CS_n). The CS_n signal enables the memory device 10 to process commands on the incoming CA<13:0> bus. Access to specific banks 12 within the memory device 10 is encoded on the CA<13:0> bus with the commands.

In addition, the command interface 14 may be configured to receive a number of other command signals. For instance, a command/address on die termination (CA_ODT) signal may be provided to facilitate proper impedance matching within the memory device 10. A reset command (RESET_n) may be used to reset the command interface 14, status registers, state machines and the like, during power-up for instance. The command interface 14 may also receive a command/address invert (CAI) signal which may be provided to invert the state of command/address signals CA<13:0> on the command/address bus, for instance, depending on the configuration of the particular memory device 10. A mirror (MIR) signal may also be provided to facilitate a mirror function. The MIR signal may be used to multiplex signals so that they can be swapped for enabling certain routing of signals to the memory device 10, based on the configuration of multiple memory devices in a particular application. Various signals to facilitate testing of the memory device 10, such as the test enable (TEN) signal, may be provided, as well. For instance, the TEN signal may be used to place the memory device 10 into a test mode for connectivity testing.

The command interface 14 may also be used to provide an alert signal (ALERT_n) to the system processor or controller for certain errors that may be detected. For instance, an alert signal (ALERT_n) may be transmitted from the memory device 10 if a cyclic redundancy check (CRC) error is detected. Other alert signals may also be generated. Further, the bus and pin for transmitting the alert signal (ALERT_n) from the memory device 10 may be used as an input pin during certain operations, such as the connectivity test mode executed using the TEN signal, as described above.

Data may be sent to and from the memory device 10, utilizing the command and clocking signals discussed above, by transmitting and receiving data signals 44 through the I/O interface 16. More specifically, the data may be sent to or retrieved from the memory banks 12 over the data bus 46, which includes a plurality of bi-directional data buses. Data I/O signals, generally referred to as DQ signals, are generally transmitted and received in one or more bi-directional data busses. For certain memory devices, such as a DDR5 SDRAM memory device, the I/O signals may be divided into upper and lower bytes. For instance, for a x16 memory device, the I/O signals may be divided into upper and lower I/O signals (e.g., DQ<15:8> and DQ<7:0>) corresponding to upper and lower bytes of the data signals, for instance.

To allow for higher data rates within the memory device 10, certain memory devices, such as DDR memory devices may utilize data strobe signals, generally referred to as DQS signals. The DQS signals are driven by the external processor or controller sending the data (e.g., for a write command) or by the memory device 10 (e.g., for a read command). For read commands, the DQS signals are effectively additional data output (DQ) signals with a predetermined pattern. For write commands, the DQS signals are used as clock signals to capture the corresponding input data. As with the clock signals (Clk_t/and Clk_c), the data strobe (DQS) signals may be provided as a differential pair of data strobe signals (DQS_t/and DQS_c) to provide differential pair signaling during reads and writes. For certain memory devices, such as a DDR5 SDRAM memory device, the differential pairs of DQS signals may be divided into upper and lower data strobe signals (e.g., UDQS_t/and UDQS_c; LDQS_t/and LDQS_c) corresponding to upper and lower bytes of data sent to and from the memory device 10, for instance.

An impedance (ZQ) calibration signal may also be provided to the memory device 10 through the I/O interface 16. The ZQ calibration signal may be provided to a reference pin and used to tune output drivers and ODT values by adjusting pull-up and pull-down resistors of the memory device 10 across changes in process, voltage and temperature (PVT) values. Because PVT characteristics may impact the ZQ resistor values, the ZQ calibration signal may be provided to the ZQ reference pin to be used to adjust the resistance to calibrate the input impedance to known values. As will be appreciated, a precision resistor is generally coupled between the ZQ pin on the memory device 10 and GND/VSS external to the memory device 10. This resistor acts as a reference for adjusting internal ODT and drive strength of the IO pins.

In addition, a loopback signal (LOOPBACK) may be provided to the memory device 10 through the I/O interface 16. The loopback signal may be used during a test or debugging phase to set the memory device 10 into a mode wherein signals are looped back through the memory device 10 through the same pin. For instance, the loopback signal may be used to set the memory device 10 to test the data output of the memory device 10. Loopback may include both a data and a strobe or possibly just a data pin. This is generally intended to be used to monitor the data captured by the memory device 10 at the I/O interface 16.

As will be appreciated, various other components such as power supply circuits (for receiving external VDD and VSS signals), mode registers (to define various modes of programmable operations and configurations), read/write amplifiers (to amplify signals during read/write operations), temperature sensors (for sensing temperatures of the memory device 10), etc., may also be incorporated into the memory system 10. Accordingly, it should be understood that the block diagram of FIG. 1 is only provided to highlight certain functional features of the memory device 10 to aid in the subsequent detailed description.

In some embodiments, the memory device 10 may be disposed in (physically integrated into or otherwise connected to) a host device or otherwise coupled to a host device. The host device may include any one of a desktop computer, laptop computer, pager, cellular phone, personal organizer, portable audio player, control circuit, camera, etc. The host device may also be a network node, such as a router, a server, or a client (e.g., one of the previously-described types of computers). The host device may be some other sort of electronic device, such as a copier, a scanner, a printer, a game console, a television, a set-top video distribution or recording system, a cable box, a personal digital media player, a factory automation system, an automotive computer system, or a medical device. (The terms used to describe these various examples of systems, like many of the other terms used herein, may share some referents and, as such, should not be construed narrowly in virtue of the other items listed.)

The host device may, thus, be a processor-based device, which may include a processor, such as a microprocessor, that controls the processing of system functions and requests in the host. Further, any host processor may comprise a plurality of processors that share system control. The host processor may be coupled directly or indirectly to additional system elements of the host, such that the host processor controls the operation of the host by executing instructions that may be stored within the host or external to the host.

As discussed above, data may be written to and read from the memory device 10, for example, by the host whereby the memory device 10 operates as volatile memory, such as Double Data Rate DRAM (e.g., DDR5 SDRAM). The host may, in some embodiments, also include separate non-volatile memory, such as read-only memory (ROM), PC-RAM, silicon-oxide-nitride-oxide-silicon (SONOS) memory, metal-oxide-nitride-oxide-silicon (MONOS) memory, polysilicon floating gate based memory, and/or other types of flash memory of various architectures (e.g., NAND memory, NOR memory, etc.) as well as other types of memory devices (e.g., storage), such as solid state drives (SSD's), MultimediaMediaCards (MMC's), SecureDigital (SD) cards, CompactFlash (CF) cards, or any other suitable device. Further, it should be appreciated that the host may include one or more external interfaces, such as Universal Serial Bus (USB), Peripheral Component Interconnect (PCI), PCI Express (PCI-E), Small Computer System Interface (SCSI), IEEE 1394 (Firewire), or any other suitable interface as well as one or more input devices to allow a user to input data into the host, for example, buttons, switching elements, a keyboard, a light pen, a stylus, a mouse, and/or a voice recognition system, for instance. The host may optionally also include an output device, such as a display coupled to the processor and a network interface device, such as a Network Interface Card (NIC), for interfacing with a network, such as the Internet. As will be appreciated, the host may include many other components, depending on the application of the host.

The host may operate to transfer data to the memory device 10 for storage and may read data from the memory device 10 to perform various operations at the host. Accordingly, to facilitate these data transmissions, in some embodiments, the I/O interface 16 may include a data transceiver 48 that operates to receive and transmit DQ signals to and from the I/O interface 16.

Figure 2:
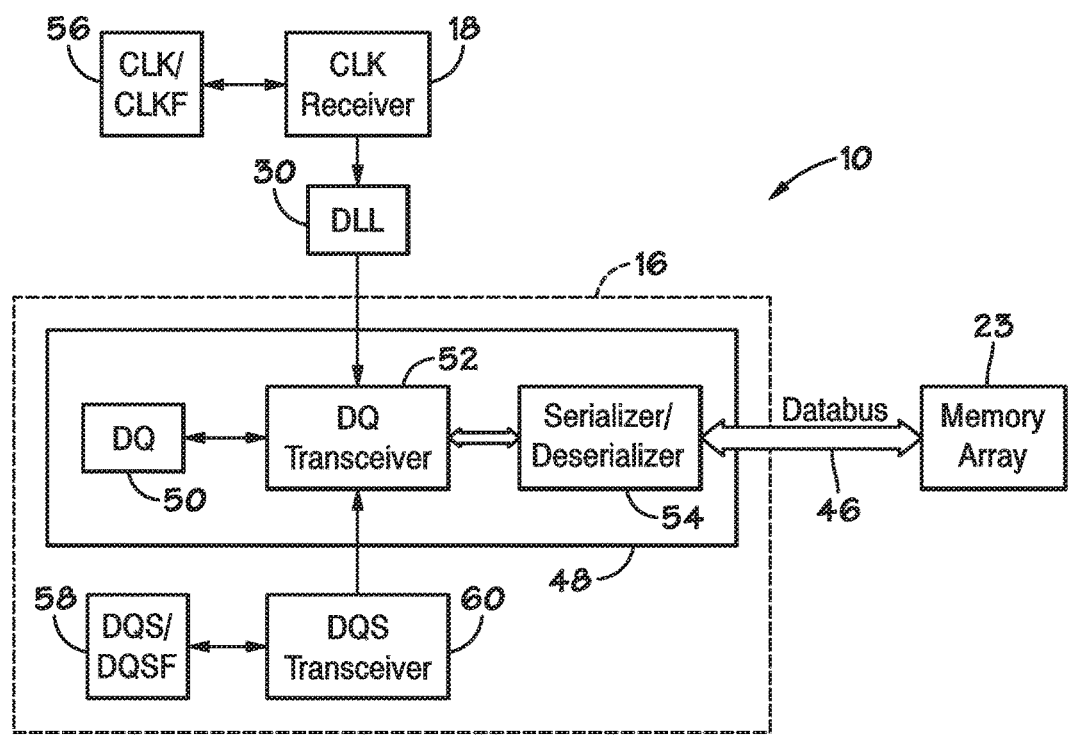
FIG. 2 illustrates a block diagram illustrating a data transceiver of the I/O interface of FIG. 1, according to an embodiment of the present disclosure.

FIG. 2 illustrates the I/O interface 16 of the memory device 10 generally and, more specifically, the data transceiver 48. As illustrated, the data transceiver 48 of the I/O interface 16 may include a DQ connector 50, a DQ transceiver 52, and a serializer/deserializer 54. It should be noted that in some embodiments, multiple data transceivers 48 may be utilized that each single data transceiver 48 may be utilized in connection with a respective one of each of upper and lower I/O signals (e.g., DQ<15:8> and DQ<7:0>) corresponding to upper and lower bytes of the data signals, for instance. Thus, the I/O interface 16 may include a plurality of data transceivers 48, each corresponding to one or more I/O signals (e.g., inclusive of a respective DQ connector 50, DQ transceiver 52, and serializer/deserializer 54).

The DQ connector 50 may be, for example a pin, pad, combination thereof, or another type of interface that operates to receive DQ signals, for example, for transmission of data to the memory array 23 as part of a data write operation. Additionally, the DQ connector 50 may operate to transmit DQ signals from the memory device 10, for example, to transmit data from the memory array 23 as part of a data read operation. To facilitate these data reads/writes, a DQ transceiver 52 is present in data transceiver 48. In some embodiments, for example, the DQ transceiver 52 may receive a clock signal generated by the internal clock generator 30 as a timing signal for determining an output timing of a data read operation from the memory array 23. The clock signal transmitted by the internal clock generator 30 may be based upon one or more clocking signals received by the memory device 10 at clock connector 56 (e.g., a pin, pad, the combination thereof, etc.) and routed to the internal clock generator 30 via the clock input circuit 18. Thus, the DQ transceiver 52 may receive a clock signal generated by the internal clock generator 30 as a timing signal for determining an output timing of a data read operation from the memory array 23.

The DQ transceiver 52 of FIG. 2 may also, for example, receive one or more DQS signals to operate in strobe data mode as part of a data write operation. The DQS signals may be received at a DQS connector 60 (e.g., a pin, pad, the combination thereof, etc.) and routed to the DQ transceiver 52 via a DQS transceiver 60 that operates to control a data strobe mode via selective transmission of the DQS signals to the DQ transceiver 52. Thus, the DQ transceiver 52 may receive DQS signals to control a data write operation from the memory array 23.

As noted above, the data transceiver 48 may operate in modes to facilitate the transfers of the data to and from the memory device 10 (e.g., to and from the memory array 23). For example, to allow for higher data rates within the memory device 10, a data strobe mode in which DQS signals are utilized, may occur. The DQS signals may be driven by an external processor or controller sending the data (e.g., for a write command) as received by the DQS connector 58 (e.g., a pin, pad, the combination thereof, etc.). In some embodiments, the DQS signals are used as clock signals to capture the corresponding input data.

In addition, as illustrated in FIG. 2, the data transceiver 48 also includes a serializer/deserializer 54 that operates to translate serial data bits (e.g., a serial bit stream) into a parallel data bits (e.g., a parallel bit stream) for transmission along data bus 46 during data write operations of the memory device 10. Likewise, the serializer/deserializer 54 operates to translate parallel data bits (e.g., a parallel bit stream) into serial data bits (e.g., a serial bit stream) during read operations of the memory device 10. In this manner, the serializer/deserializer 54 operates to translate data received from, for example, a host device having a serial format into a parallel format suitable for storage in the memory array 23. Likewise, the serializer/deserializer 54 operates to translate data received from, for example, the memory array 23 having a parallel format into a serial format suitable for transmission to a host device.

Figure 3:
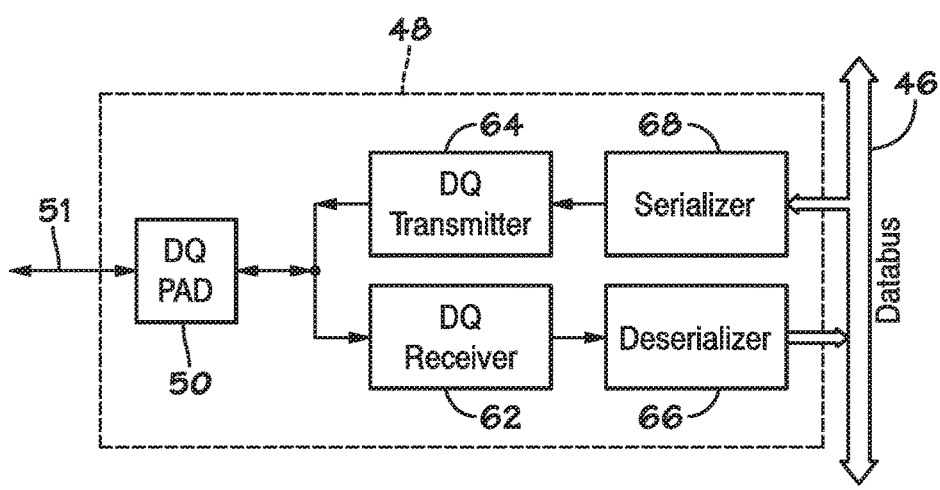
FIG. 3 illustrates a block diagram of an embodiment of the data transceiver of FIG. 2, according to an embodiment of the present disclosure.

FIG. 3 illustrates the data transceiver 48 as including the DQ connector 50 coupled to data transfer bus 51, a DQ receiver 62, a DQ transmitter 64 (which in combination with the DQ receiver 62 forms the DQ transceiver 52), a deserializer 66, and a serializer 68 (which in combination with the deserializer 66 forms the serializer/deserializer 54). In operation, the host (e.g., a host processor or other memory device described above) may operate to transmit data in a serial form across data transfer bus 51 to the data transceiver 48 as part of a data write operation to the memory device 10. This data is received at the DQ connector 50 and transmitted to the DQ receiver 62. The DQ receiver 62, for example, may perform one or more operations on the data (e.g., amplification, driving of the data signals, etc.) and/or may operate as a latch for the data until reception of a respective DQS signal that operates to coordinate (e.g., control) the transmission of the data to the deserializer 66. As part of a data write operation, the deserializer 66 may operate to convert (e.g., translate) data from a format (e.g., a serial form) in which it is transmitted along data transfer bus 51 into a format (e.g., a parallel form) used for transmission of the data to the memory array 23 for storage therein.

Likewise, during a read operation (e.g., reading data from the memory array 23 and transmitting the read data to the host via the data transfer bus 51), the serializer 68 may receive data read from the memory array in one format (e.g., a parallel form) used by the memory array and may convert (e.g., translate) the received data into a second format (e.g., a serial form) so that the data may be compatible with one or more of the data transfer bus 51 and/or the host. The converted data may be transmitted from the serializer 68 to the DQ transmitter 64, whereby one or more operations on the data (e.g., de-amplification, driving of the data signals, etc.) may occur. Additionally, the DQ transmitter 64 may operate as a latch for the received data until reception of a respective clock signal, for example, from the internal clock generator 30, that operates to coordinate (e.g., control) the transmission of the data to the DQ connector 50 for transmission along the data transfer bus 51 to one or more components of the host.

Figure 4:
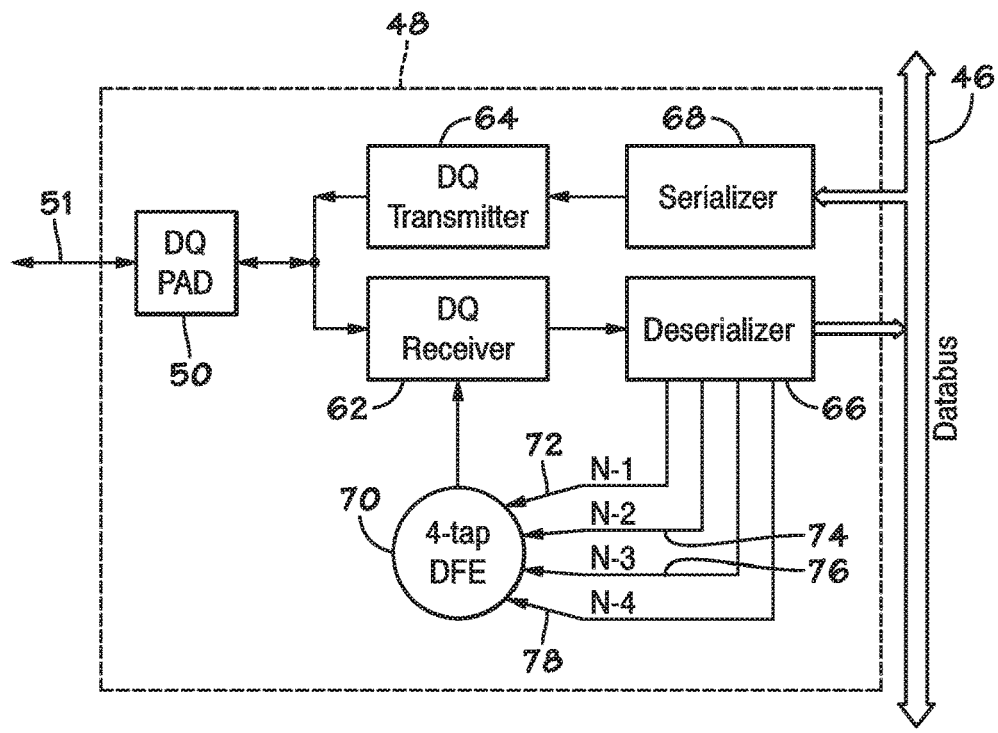
FIG. 4 illustrates a block diagram of a second embodiment of the data transceiver of FIG. 2, according to an embodiment of the present disclosure.

In some embodiments, the data received at the DQ connector 50 may be distorted. For example, data received at the DQ connector 50 may be affected by inter-symbol interference (ISI) in which previously received data interferes with subsequently received data. For example, due to increased data volume being transmitted across the data transfer bus 51 to the DQ connector 50, the data received at the DQ connector 50 may be distorted relative to the data transmitted by the host. One technique to mitigate (e.g., offset or cancel) this distortion and to effectively reverse the effects of ISI is to apply an equalization operation to the data. FIG. 4 illustrates an embodiment of the data transceiver 48 inclusive of an equalizer that may be used in this equalization operation.

FIG. 4 illustrates one embodiment of the data transceiver 48 inclusive of an equalizer, in particular, a decision feedback equalizer (DFE) 70. As illustrated, the DFE 70 is a multi-tap (e.g., four-tap) DFE 70. However, less or more than four taps may be utilized in conjunction with the DFE 70. Likewise, the DFE 70 may be disposed separate from or internal to the deserializer 66 or the DQ receiver 62. In operation, a binary output (e.g., from a latch or decision-making slicer) is captured in one or more data latches or data registers. In the present embodiment, these data latches or data registers may be disposed in the deserializer 66 and the values stored therein may be latched or transmitted along paths 72, 74, 76, and 78.

When a data bit is received at the DQ receiver 62, it may be identified as being transmitted from the host as bit "n" and may be received at a time to as distorted bit n (e.g., bit n having been distorted by ISI). The most recent bit received prior to distorted bit n being received at the DQ receiver 62, e.g., received at time of t-1 that immediately precedes time of to, may be identified as n-1 and is illustrated as being transmitted from a data latch or data register along path 72. The second most recent bit received prior to distorted bit n being received at the DQ receiver 62, e.g., received at time of t-2 that immediately precedes time of t-1, may be identified as n-2 and is illustrated as being transmitted from a data latch or data register along path 74. The third most recent bit received prior to distorted bit n being received at the DQ receiver 62, e.g., received at time of t-3 that immediately precedes time of t-2, may be identified as n-3 and is illustrated as being transmitted from a data latch or data register along path 76. The fourth most recent bit received prior to distorted bit n being received at the DQ receiver 62, e.g., received at time of t-3 that immediately precedes time of t-2, may be identified as n-4 and is illustrated as being transmitted from a data latch or data register along path 78. Bits n-1, n-2, n-3, and n-4 may be considered the group of bits that interfere with received distorted bit n (e.g., bits n-1, n-2, n-3, and n-4 cause ISI to host transmitted bit n) and the DFE 70 may operate to offset the distortion caused by the group of bits n-1, n-2, n-3, and n-4 on host transmitted bit n.

Thus, the values latched or transmitted along paths 72, 74, 76, and 78 may correspond, respectively, to the most recent previous data values (e.g., preceding bits n-1, n-2, n-3, and n-4) transmitted from the DQ receiver 62 to be stored in memory array 23. These previously transmitted bits are fed back along paths 72, 74, 76, and 78 to the DFE 70, which operates to generate weighted taps (e.g., voltages) that may be added to the received input signal (e.g., data received from the DQ connector 50, such as distorted bit n) by means of a summer (e.g., a summing amplifier). In other embodiments, the weighted taps (e.g., voltages) may be combined with an initial reference value to generate an offset that corresponds to or mitigates the distortion of the received data (e.g., mitigates the distortion of distorted bit n). In some embodiments, taps are weighted to reflect that the most recent previously received data (e.g., bit n-1) may have a stronger influence on the distortion of the received data (e.g., distorted bit n) than bits received at earlier times (e.g., bits n-1, n-2, and n-3). The DFE 70 may operate to generate magnitudes and polarities for taps (e.g., voltages) due to each previous bit to collectively offset the distortion caused by those previously received bits.

For example, for the present embodiment, each of previously received bits n-1, n-2, n-3, and n-4 could have had one of two values (e.g., a binary 0 or 1), which was transmitted to the deserializer 66 for transmission to the memory array 23 and, additionally, latched or saved in a register for subsequent transmission along respective paths 72, 74, 76, and 78. In the illustrated embodiment, this leads to sixteen (e.g., $2^4$) possible binary combinations (e.g., 0000, 0001, 0010, . . . , 1110, or 1111) for the group of bits n-1, n-2, n-3, and n-4. The DFE 70 operates to select and/or generate corresponding tap values for whichever of the aforementioned sixteen combinations are determined to be present (e.g., based on the received values along paths 72, 74, 76, and 78) to be used to adjust either the input value received from the DQ connector 50 (e.g., distorted bit n) or to modify a reference value that is subsequently applied to the input value received from the DQ connector 50 (e.g., distorted bit n) so as to cancel the ISI distortion from the previous bits in the data stream (e.g., the group of bits n-1, n-2, n-3, and n-4).

Figure 5:
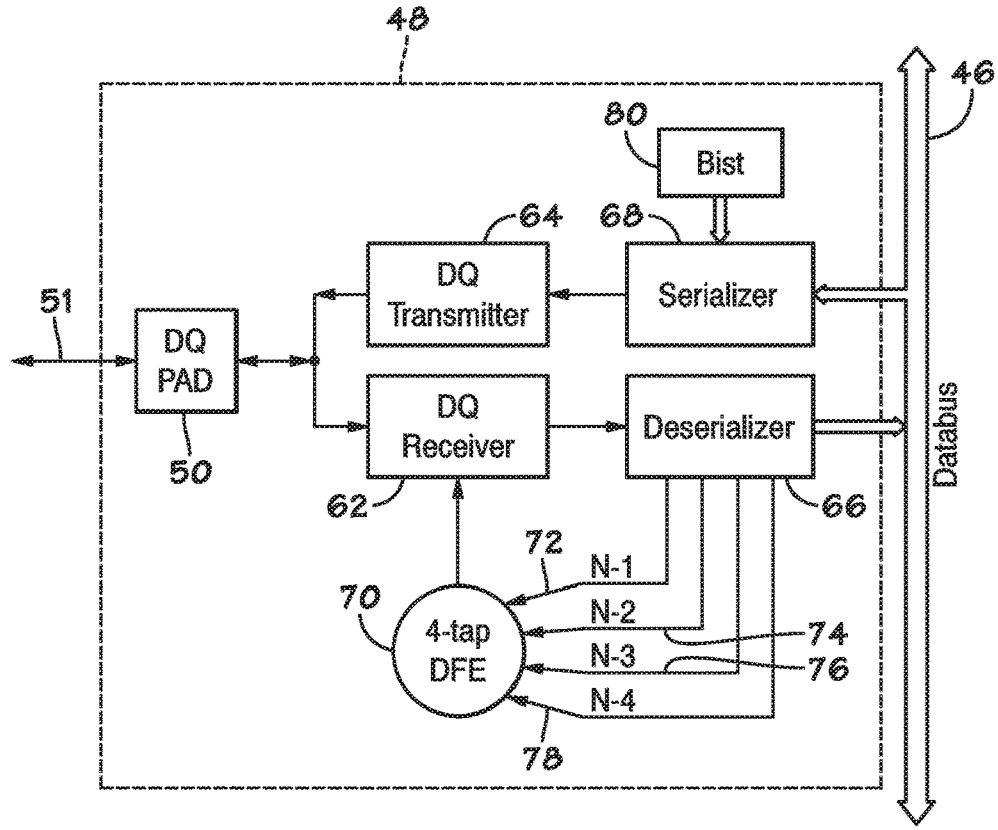
FIG. 5 illustrates a block diagram of a third embodiment of the data transceiver of FIG. 2, according to an embodiment of the present disclosure.

Use of equalization (e.g., decision feedback equalization) may be beneficial so that data transmitted from a host is stored correctly in the memory array 23. Accordingly, it may be useful to test the operation and/or functionality of any equalizer circuitry (e.g., inclusive of DFE 70) being utilized in the memory device 10. Accordingly, as illustrated in FIG. 5, a built in self-test (BIST) circuit 80 may be included as part of the data transceiver 48. However, in other embodiments, the BIST circuit 80 may instead be implemented external to all data transceivers 48 of the I/O interface 16 such that a single BIST circuit 80 is coupled to all data transceivers 48 of the I/O interface 16. In some embodiments, the BIST circuit 80 may operate to provide the stimulus to test the DFE circuitry (e.g., inclusive of DFE 70) on-die (e.g., internal to the memory device 10). To facilitate generation of this stimulus, the BIST circuit 80 may include a controller or processor that runs code stored in a corresponding memory location, the code causing the processor to generate this stimulus.

In some embodiments, the BIST circuit 80 may include a data value generator able to generate a bit stream (e.g., a series of bits). In some embodiments, the data value generator may be a pseudo random bit generator. The pseudo random bit generator may be implemented via software (e.g., a controller or processor in the memory device 10 or in the BIST circuit 80 running code stored in a corresponding memory location, the code causing the processor to generate a pseudo random bit stream) or it may be implemented in hardware, for example, using a shift register, such as a linear feedback shift register in the BIST circuit 80 or in circuitry coupled thereto. Additionally, the BIST circuit 80 may either include or may be coupled to storage that stores a look-up table (LUT). The LUT may include configuration (e.g., set-up or initialization) settings for one or more elements of an output driver of the DQ transmitter 64. For example, an output driver of the DQ transmitter 64 may include one or more driver circuits that each include a pull-up (PUP) transmitter leg and a pull-down (PDN) transmitter leg. In some embodiments, activation of various PUP and PDN transmitter legs can allow for control of, for example, slew rates of the output driver.

In some embodiments, the LUT values may include one or more settings for the number and strength of PUP and PDN transmitter legs to be activated at a given time. The BIST circuit 80 may transmit these values to the DQ transmitter 64 to control operation of the PUP and PDN transmitter legs in conjunction with a testing operation of the DFE circuitry of the memory element 10, as will be described in greater detail below.

Figure 6:
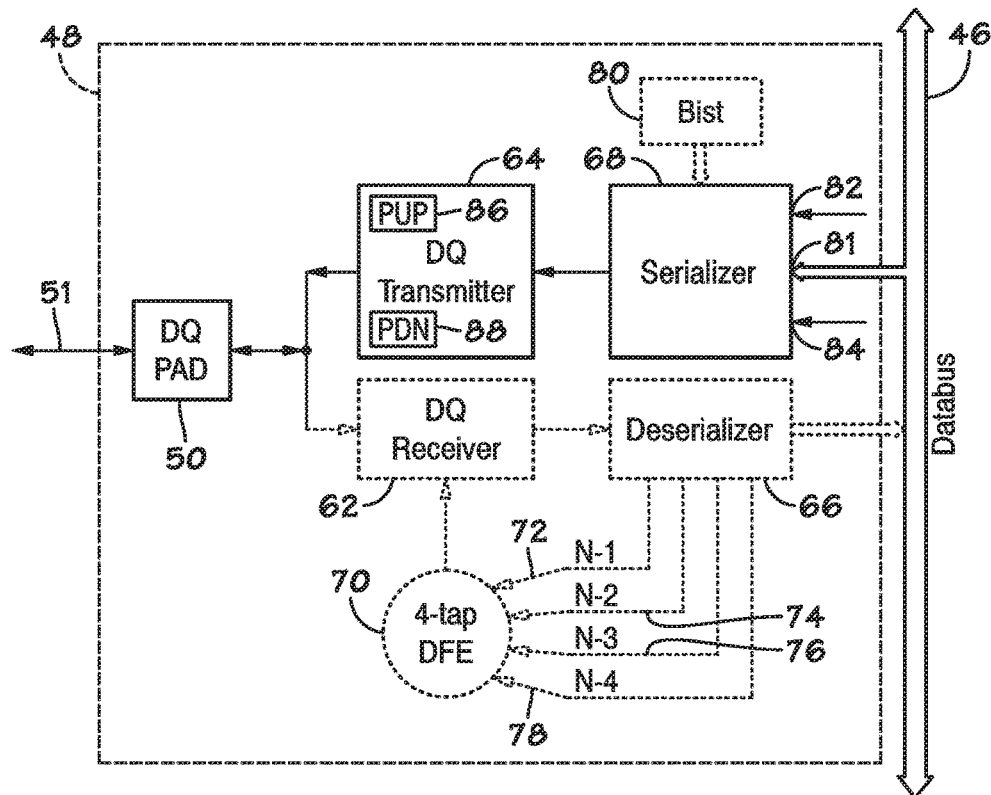
FIG. 6 illustrates a block diagram the data transceiver of FIG. 5 operating in a data read mode, according to an embodiment of the present disclosure.

FIG. 6 illustrates an embodiment of the data transceiver 48 during a data read operation. As illustrated, during a data read operation, the DQ receiver 62, the deserializer 66, the DFE 70, and the BIST circuit 80 may be disabled and/or otherwise inactive. Data signals (e.g., data bits or a set of data bits as a data stream) may be received from the data bus 46 at a data input 81 of the serializer 68. Likewise, a clocking signal or clock may be received at a clock input 82 from, for example, the internal clock generator 30. This clocking signal or clock may be used to control, for example, transmission of data (once converted from parallel form to serial form) to the DQ transmitter 64.

As additionally illustrated in FIG. 6, the serializer 68 may additionally receive one or more control signals at a control input 84. In some embodiments, the control signals may be one or more mode register signals and the control signals may be used to generate (or themselves may be used as) PUP and PDN transmitter leg control signals (e.g., to activate respective PUP transmitter legs 86 and PNP transmitter legs 88 of the DQ transmitter 64 and/or to control the strength of the PUP transmitter legs 86 and PNP transmitter legs 88 of the DQ transmitter 64). In this manner, the serializer 68 may receive data from the data bus 46, timing signals for synchronization at clock input 82, and PUP transmitter legs 86 and PDN transmitter legs 88 activation and strength control signals at control input 84. The serializer 68 may serialize the received data, so that it will be in a proper format for transmission to a host coupled to the memory device 10, synchronize the transmission of the converted (e.g., serialized) data, and provide respective control signals to a output driver of the DQ transmitter 64 to initialize (e.g., configure or set-up) PUP transmitter legs 86 and PNP transmitter legs 88 of an output driver of the DQ transmitter 64 to effect transmission of the converted (e.g., serialized) data by the DQ transmitter 64.

Figure 7:
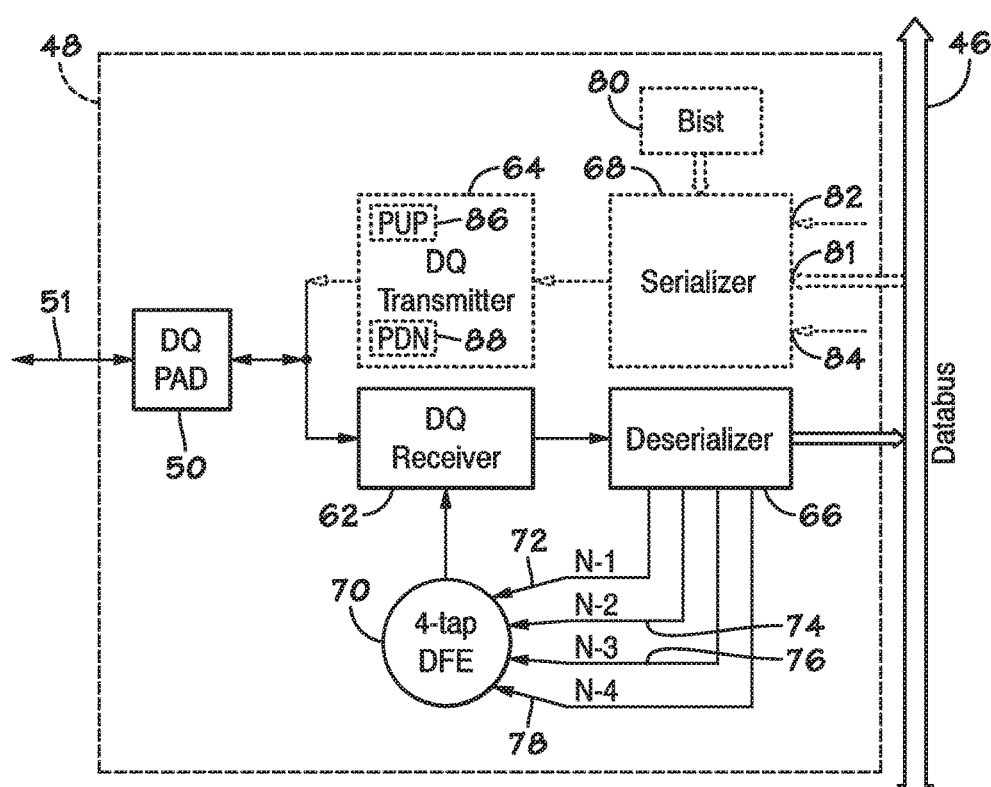
FIG. 7 illustrates a block diagram the data transceiver of FIG. 5 operating in a data write mode, according to an embodiment of the present disclosure.

FIG. 7 illustrates an embodiment of the data transceiver 48 during a data write operation. As illustrated, during a data write operation, the DQ transmitter 64, the serializer 68, and the BIST circuit 80 may be disabled and/or otherwise inactive. Data signals (e.g., data bits or a set of data bits as a data stream) may be received from the DQ connection 50 by the DQ receiver 62. The DQ receiver 62 may operate as discussed above in conjunction with the DFE 70 to offset ISI distortion received with the data prior to its transmission to the deserializer 66. The deserializer 66 may covert the format of the data it receives from serial data to parallel data for transmission to and storage in the memory array 23.

Figure 8:
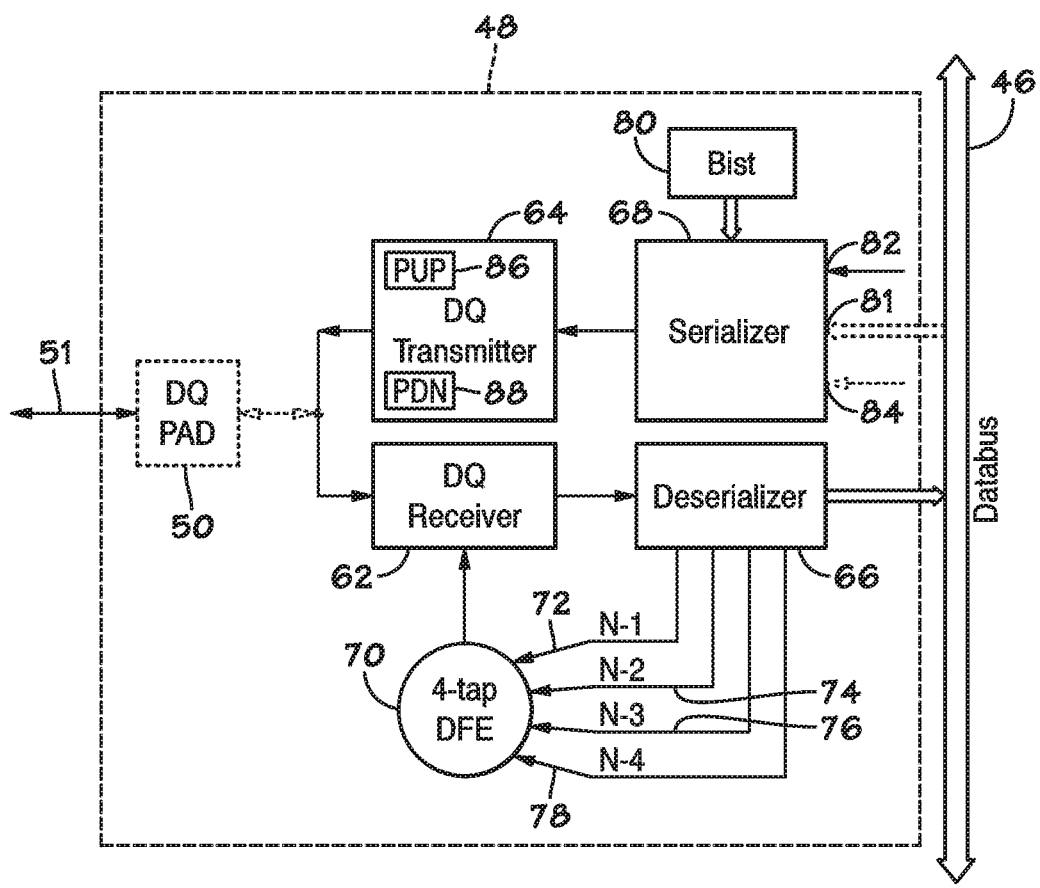
FIG. 8 illustrates a block diagram the data transceiver of FIG. 5 operating in a testing mode, according to an embodiment of the present disclosure.

FIG. 8 illustrates a third embodiment separate from the data read operation and the data write operation described above. FIG. 8 illustrates an embodiment of the data transceiver 48 during a testing operation (e.g., a test mode) to test the operation of the decision feedback equalization process and its circuitry (e.g., to determine whether the DFE 70 of the memory device 10 is functioning correctly to offset distortion of data received at the DQ connection 50). As illustrated, during the testing operation, the DQ connection 50 may be disabled and/or otherwise inactive. Likewise, while the serializer 68 is active, data input 81 and control input 84 of the serializer 68 may be disabled and/or otherwise inactive. Instead of receiving data from inactive data input 81, the serializer 68 may receive data from the BIST circuit 80 (e.g., from a data value generator) and the received data from the BIST circuit 80 may be a pseudo random bit stream. Likewise, instead of receiving one or more control signals from inactive control input 84, the serializer 68 may receive control signals from the BIST circuit 80 (e.g., signals corresponding to LUT values of the number and strength of PUP and PDN transmitter legs 86 and 88 to be activated). These control signals may be selected to control and set various combinations of PUP and PDN transmitter legs 86, 88 (e.g., the number and strength of the PUP and PDN transmitter legs 86, 88) to control the output of the output driver of the DQ transmitter 64 (e.g., the voltage that would be transmitted to the DQ connection 50, a DQ pad voltage) with very fine resolution. The controlled output of the PUP and PDN transmitter legs 86, 88 and, thus, the output of the output driver of the DQ transmitter 64 may be a waveform having a multi-level signal that can be used to simulate or mimic channel distortion (e.g., ISI of data transmitted along data transfer bus 51).

The output of the output driver of the DQ transmitter 64 may be transmitted as an input pattern in place of (e.g., as a substitute for) data from the DQ connection 50 as in input to the DQ receiver 62. This input to the DQ receiver 62 can have decision feedback equalization applied thereto and the resultant data can be transmitted to the deserializer 66 for transmission to the memory array 23 as test data to be stored. A subsequent data read of this test data from the memory array 23 can be performed and retrieved stored test data can be compared to the originally generated data from the BIST circuit 80 either in the BIST circuit 80 (if, for example, the BIST circuit 80 stores the BIST circuit 80 generated data for internal comparison), in a testing circuit internal to the memory device 10 (if, for example, the BIST circuit 80 transmits the BIST circuit 80 generated data in parallel to the serializer 68 and to the testing circuit for comparison), or via a test device coupled to the memory device 10 (if, for example, the BIST circuit 80 transmits the BIST circuit 80 generated data to an externally coupled test device and the memory device 10 transmits the retrieved stored test data to the test device for comparison).

In other embodiments, when the output of the output driver of the DQ transmitter 64 in the testing mode is transmitted as an input pattern in place of (e.g., as a substitute for) data from the DQ connection 50 as in input to the DQ receiver 62 for decision feedback equalization, in place of or in addition to the data transmitted from the receiver to the deserializer 66 for transmission to the memory array 23 as test data to be stored, the output of the DQ receiver 62 having serial decision feedback equalization adjusted test data can be transmitted to the BIST circuit 80, a testing circuit internal to the memory device 10, or a test device coupled to the memory device 10. This serial decision feedback equalization adjusted test data can be compared to the originally generated data from the BIST circuit 80 either in the BIST circuit 80 (if, for example, the BIST circuit 80 stores the BIST circuit 80 generated data for internal comparison), in a testing circuit internal to the memory device 10 (if, for example, the BIST circuit 80 transmits the BIST circuit 80 generated data in parallel to the serializer 68 and to the testing circuit for comparison), or via a test device coupled to the memory device 10 (if, for example, the BIST circuit 80 transmits the BIST circuit 80 generated data to an externally coupled test device and the DQ receiver 62 transmits the serial decision feedback equalization adjusted test data to the test device for comparison).

For any and/or all of the comparison systems and methods described above in which the comparison of the BIST circuit 80 generated data and the decision feedback equalization corrected data is undertaken, if the retrieved stored test data matches the originally generated data from the BIST circuit 80, the BIST circuit 80, a testing circuit of the memory device 10, or a test device coupled to the memory device 10 can generate an indication that the decision feedback equalization circuitry of the memory device 10 (including DFE 70) is functioning properly. Alternatively, if the retrieved stored test data does not matches the originally generated data from the BIST circuit 80, the BIST circuit 80, the testing circuit of the memory device 10, or a test device can generate an indication that the decision feedback equalization circuitry of the memory device 10 (including DFE 70) is not functioning properly. These indications may be transmitted to the host, may be displayed, or may be utilized (e.g., by the host or by the memory device 10) to initialize adjustment of the decision feedback equalization circuitry (e.g., to tune or otherwise adjust the operation of the decision feedback equalization circuitry) to correct for any inconsistencies determined by the aforementioned comparisons.

Figure 9:
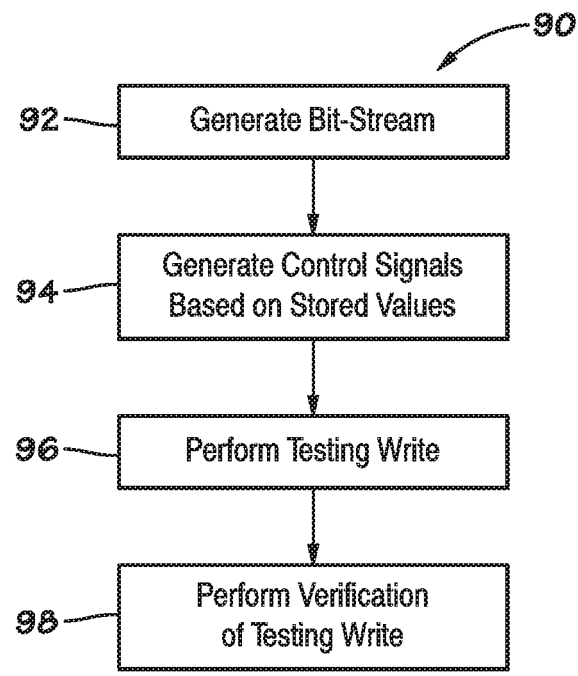
FIG. 9 illustrates a flow chart of the operation of the data transceiver of FIG. 5, according to an embodiment of the present disclosure.

FIG. 9 illustrates a flow chart 90 of one embodiment of the decision feedback equalization testing methodology described above. As illustrated in step 92, the BIST circuit 80 may generate a bit-stream from, for example, a data value generator for transmission to the serializer 68. This bit-stream may be, for example, a pseudo random bit stream. In step 94 (which may be performed concurrently with, prior to, or subsequent to step 92), the BIST circuit 80 may generate one or more control signals for transmission to the serializer 68. These control signals may correspond to LUT values of the number and strength of PUP and PDN transmitter legs 86 and 88 to be activated. Accordingly, steps 92 and 94 correspond to on-die (e.g., internal to memory device 10) testing circuitry (e.g., BIST circuit 80) that can generate a bit-stream and can utilize a LUT to set certain number of PUP/PDN transmitter legs 86, 88 to be turned on in a DQ output driver of a DQ transmitter 64. It should be noted that the generation of the bit-stream in step 92 and the generation of the control signals may be part of (or precede) placing the memory device 10 into a decision feedback equalization test mode (e.g., to allow for testing of decision feedback equalization circuitry inclusive of the DFE 70 of the memory device 10).

As part of the decision feedback equalization test mode, a testing write operation may be performed, as illustrated in step 96. The testing write operation may include a write of input values to the DQ receiver 62 (e.g., a continuous burst write) that are generated in connection with steps 92 and 94 above. For example, the testing write may include the DQ output driver of the DQ transmitter 64 generating an input stimulus to the DQ receiver 62 (e.g., in place of an input from the DQ connector 50) based on the bit stream generated in step 92 (e.g., based on a pseudo random bit stream generated by the BIST circuit 80) and the control signals generated in step 94. The testing write, in some embodiments, may further include writing of resultant values generated from the input stimulus to memory array 23. In step 98, verification of the testing write in step 96 may be undertaken. This verification may include halting of the testing write as well as verification that the bit-stream written to the memory array 23 matches expected data (e.g., the bit stream generated in step 92). This verification in step 98 may additionally and/or alternatively include verification that the bit-stream transmitted to the deserializer 66 matches expected data (e.g., the bit stream generated in step 92).

Figure 10:
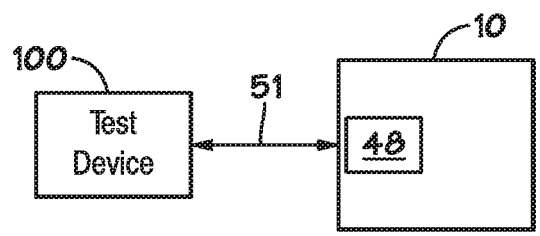
FIG. 10 illustrates a memory testing system, according to an embodiment of the present disclosure.

FIG. 10 illustrates a memory testing system, according to an embodiment of the present disclosure. As illustrated, a test device 100 may be coupled to the memory device 10 for testing of one or more components of the memory device 10 and/or one or more portions of the memory device 10. In some embodiments, the test device 100 may include a controller or processor that runs code stored in a corresponding memory location, the code causing the processor to performing the decision feedback equalization testing described below. The test device 100 may include one or more output connections, for example, that can be coupled to the memory device 10 via data transfer bus 51 (or directly to DQ connector 50) to provide input data (e.g., data signals) to the memory device 10. Likewise, test device 100 may include one or more input connections, for example, that can be coupled to the memory device 10 to receive data signals or other information from the memory device 10.

In some embodiments, the test device 100 may operate to generate and transmit input data as including generated ISI. The test data generated and transmitted by the test device 100 may, for example, include signals that mimic ISI to be offset by the decision feedback equalization circuitry of the memory device 10. Thus, if, for example, the decision feedback equalization circuitry of the memory device 10 is calibrated to generate particular tap values in response to reception of a particular data stream, the test device 100 may be calibrated to introduce input data that corresponds to ISI input data that would be correctable by the particular tap values. In this manner, the determination of the correct operation of the DFE circuitry of the memory device 10 may be accomplished by the test device 100.

In some embodiments, the test device 100 may receive decision feedback equalization correction values (e.g., tap values) from the memory device 10. Alternatively, a user may program the test device 100 with either decision feedback equalization correction values (e.g., tap values) from the memory device 10. These correction values may correspond to a look-up table or other set of stored alteration values that may be applied to the test data generated by the test device 100. In this manner, the test device 100 may generate an altered version of test data for transmission to the memory device 10 based upon decision feedback equalization correction to be performed in the memory device 10, may receive back data from the memory device 10 that has had decision feedback equalization performed thereon, and can compare the received data with the original (unaltered) test data to determine whether the decision feedback equalization circuitry of the memory device 10 has operated and/or is functioning correctly. This result may be displayed, for example, on the test device 100 and/or may be stored in the memory device 10 for subsequent analysis or use.

In some embodiments, differing decision feedback equalization correction values (e.g., tap values) for the memory device 10 may be applied by a user, by the memory device 10 itself, or by the test device 100. These differing correction values may be used to generate a second altered version of the test data to test the operation of the decision feedback equalization circuitry of the memory device 10 (e.g., the test device 100 may generate a second altered version of test data for transmission to the memory device 10 based upon decision feedback equalization correction to be performed in the memory device 10, may receive back data from the memory device 10 that has had decision feedback equalization performed thereon, and can compare the received data with the original (unaltered) test data to determine whether the decision feedback equalization circuitry of the memory device 10 has operated and/or is functioning correctly). This result may be displayed, for example, on the test device 100 and/or may be stored in the memory device 10 for subsequent analysis or use.

In some embodiments, the test device 100 may display a data eye diagram that represents the signals being received from the memory device 10 in response to the input data provided by the test device 100. The techniques described above with respect to providing altered input data to the memory device 10 may allow for isolation of decision feedback equalization circuitry faults that otherwise might be reflective of incorrect timing, polarity, and other factors as causing degradation to the data eye diagram. By applying ISI distorted input data to the memory device 10 by the test device 100, verification of correct decision feedback equalization functionality in simulation and back-end testing may be accomplished. For example, by generating and providing an input pattern which uses modified data levels (e.g., modified voltage input high Viii or high data puts a d modified voltage input low Vil or low data inputs) to simulate the input through a channel with ISI, the testing device 100 can mimic distortion to be corrected by the decision feedback equalization circuitry of the memory device 10 and, accordingly, can determine whether the decision feedback equalization circuitry is operating and/or is functioning correctly when reading out decision feedback equalization adjusted bits from the memory device 10 as part of a testing operation.

In some embodiments, the test device 100 may be equipped to tune the input data transmitted to the memory 10. For example, a filter, such as an RC filter, can applied to the test data in order to more accurately duplicate a real system input. By applying the new input pattern in simulation (e.g., in a test mode of the memory device 10), the decision feedback equalization circuitry of the memory device 10 can be verified to correctly restore the original (unaltered) input sequence. Any choice of post-cursor values (e.g., input data alterations) can be used for any number of taps of the memory device 10, thereby enabling accurate simulation verification for an entire range of decision feedback equalization correction.

Figure 11:
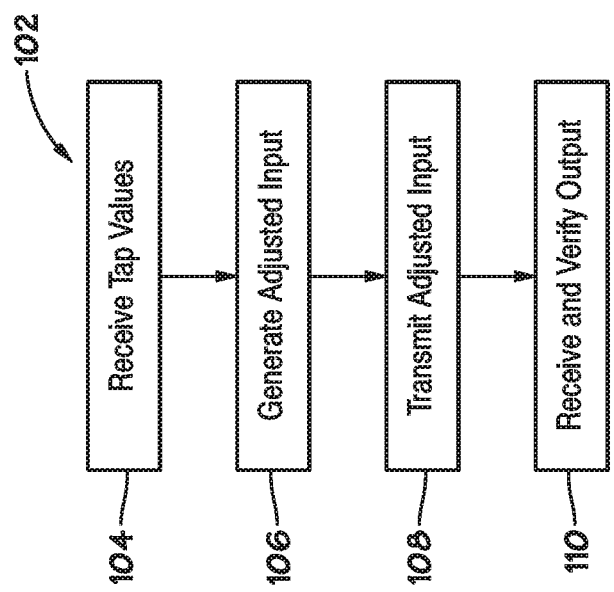
FIG. 11 illustrates a flow chart of the operation of the memory testing device of FIG. 10, according to an embodiment of the present disclosure.

FIG. 11 illustrates a flow chart 102 describing one embodiment of the aforementioned decision feedback equalization circuitry testing techniques. In step 104, the test device 100 may receive decision feedback equalization circuitry configuration settings (e.g., tap values). These settings may be automatically received from the memory device 10 as part of the testing operation or, alternatively, these may be entered via a user. In step 106, an adjusted input may be generated by the test device 100. In some embodiments, this adjusted input may be determined and generated based upon the settings of the decision feedback equalization circuitry and may cause an input data stream to be altered in a manner consistent with expected ISI to be corrected by the decision feedback equalization circuitry of the memory device 10. As previously noted, the alteration of the input test data may be accomplished through modifying the input data according to stored values or stored values may replace the input data values to generate the altered input test data. In step 108, the test device 100 may transmit the adjusted input test data to the memory device 10 as part of a testing procedure. The memory device 10 may output ISI corrected data back to the test device 100 in step 110, whereby the test device 100 can compare the received output from the memory device 10 against the input (unaltered) data to determine whether the decision feedback equalization circuitry is operating correctly.

Figure 12:
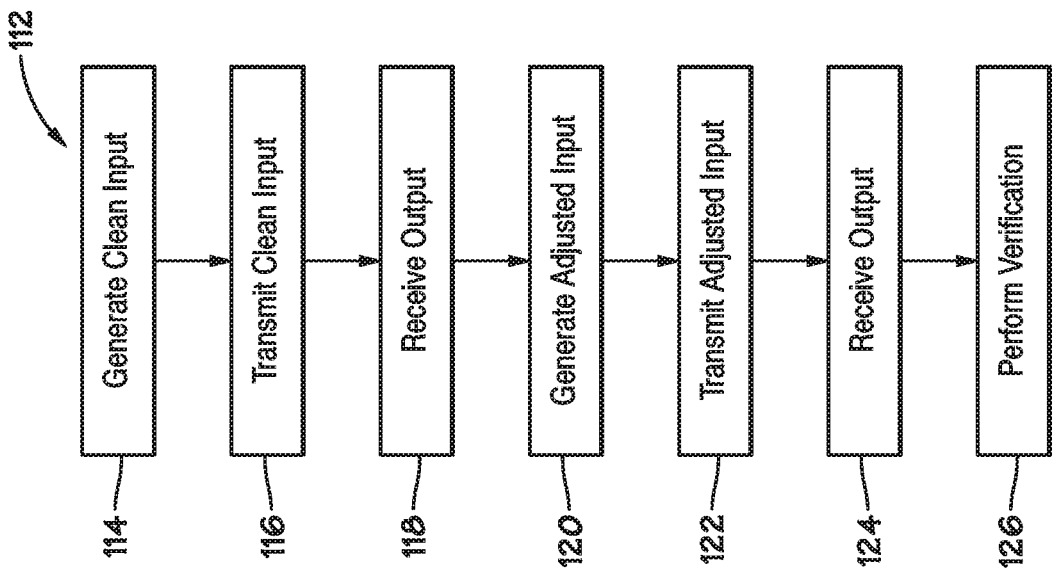
FIG. 12 illustrates a second flow chart of the operation of the memory testing device of FIG. 10, according to an embodiment of the present disclosure.

A similar method can be applied in back-end tester to verify decision feedback equalization functionality. For example, as illustrated in flow chart 112 of FIG. 12, a data eye can be generated for a clean input (e.g., no alteration of the input data) in the testing device 100 via steps 114, 116, and 118. More particularly, in step 114, the test device 100 may generate input test data to be transmitted to the memory device 10 in step 116. The memory device 10 may apply decision feedback equalization to the data stream and output an ISI corrected data output to the test device 100 that is received in step 118. A data eye diagram can be generated at the test device 100 for this unaltered test data input to the memory device 10.

In step 120, an adjusted test data input may be generated by the test device 100. This adjusted data input may be determined and generated based upon the settings of the decision feedback equalization circuitry and may cause an input data stream to be altered in a manner consistent with expected ISI to be corrected by the decision feedback equalization circuitry of the memory device 10. As previously noted, the alteration of the input test data may be accomplished through modifying the input data according to stored values or stored values may replace the input data values to generate the altered input test data. In step 122, the test device 100 may transmit the adjusted input test data to the memory device 10 as part of a testing procedure. The memory device 10 may output ISI corrected data back to the test device 100 in step 124, whereby the test device 100 can generate a second data eye can be generated with respect to the modified data levels (e.g., modified Vih or high data inputs and modified Vil or low data inputs) that simulate the input through a channel with ISI. Verification of the operation of the decision feedback equalization circuitry of the memory device 10 can be performed in step 126, for example, by determining whether the first and second data eyes match whereby when the first and second data eyes, the decision feedback equalization circuitry can be confirmed as having performing correctly.

While the present disclosure may be susceptible to various modifications and alternative forms, specific embodiments have been shown by way of example in the drawings and have been described in detail herein. However, it should be understood that the present disclosure is not intended to be limited to the particular forms disclosed. Rather, the present disclosure is intended to cover all modifications, equivalents, and alternatives falling within the spirit and scope of the present disclosure as defined by the following appended claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A memory device, comprising:
   one or more memory banks configured to store data;
   a data receiver configured to:
     receive distorted input data as part of a data stream;
     apply a correction factor to the distorted input data to offset inter-symbol interference from the data stream on the distorted input data; and
     generate the data by applying the correction factor to the distorted data; and
   a test circuit internal to the memory device, wherein the test circuit is configured to generate the data stream.

2. The memory device of claim 1, comprising a transmitter coupled to the one or more memory banks, wherein the transmitter is configured to receive the second data from the memory banks when the memory device operates in a first mode of operation.

3. The memory device of claim 2, wherein the test circuit is coupled to the transmitter, wherein the transmitter is configured to receive the data stream from the test circuit when the memory device operates in a second mode of operation.

4. The memory device of claim 3, wherein the transmitter comprises a plurality of transmitter legs coupled to an output connector of the memory device.

5. The memory device of claim 4, wherein the plurality of transmitter legs are additionally coupled to the receiver.

6. The memory device of claim 5, wherein the test circuit is configured to generate control signals to control selective activation of each transmitter leg of the plurality of transmitter legs.

7. The memory device of claim 6, wherein the selectively activated transmitter legs of the plurality of transmitter legs transmit the distorted input data based on the data stream received from the test circuit.

8. The memory device of claim 5, wherein the test circuit is configured to generate control signals to control the selective activation and respective strength of each transmitter leg of the plurality of transmitter legs.

9. The memory device of claim 8, wherein the selectively activated transmitter legs of the plurality of transmitter legs transmit the distorted input data based on the data stream received from the test circuit.

10. A semiconductor device, comprising:
    a test circuit internal to the device, wherein the test circuit is configured to:
      generate a data stream comprising a data value; and
      generate a control signal;
    a data transmitter configured to alter a characteristic of the data value of the data stream based upon the control signal; and
    a data receiver configured to receive the data value having an altered characteristic and apply an inverse value of the altered characteristic to the data value to regenerate the data value.

11. The semiconductor device of claim 10, wherein the data receiver is configured to transmit the regenerated data value to the test circuit.

12. The semiconductor device of claim 11, wherein the test circuit is configured to compare the regenerated data value with the data value.

13. The semiconductor device of claim 12, wherein the test circuit is configured to generate an indication that the data receiver is malfunctioning based upon the comparison of the regenerated data value with the data value.

14. The semiconductor device of claim 10, wherein the data receiver is configured to transmit the regenerated data value to one or more memory banks configured to store data.

15. The semiconductor device of claim 14, wherein the one or more memory banks are configured to transmit the regenerated data value to the test circuit.

16. The semiconductor device of claim 14, wherein the one or more memory banks are configured to transmit the regenerated data value to an external test circuit coupled to the semiconductor device.

17. The semiconductor device of claim 10, comprising:
    a second data transmitter configured to alter a characteristic of the data value of the data stream based upon the control signal;
    a second data receiver configured to receive the data value having an altered characteristic and apply an inverse value of the altered characteristic to the data value to regenerate the data value.

18. A method, comprising:
    placing a semiconductor device into a testing mode of operation;
    internally generating a data stream comprising a data value in the semiconductor device;
    internally generating a control signal configured to activate transmission legs of a transmitter at a particular strength in the semiconductor device;
    transmitting the data value from at least one activated transmission leg as an input data signal; and
    applying decision feedback equalization to the input data signal to correct for inter-symbol interference distortion of the input data signal to generate an equalized data value.

19. The method of claim 18, comprising transmitting the equalized data value to memory of the semiconductor for storage.

20. The method of claim 19, comprising reading the equalized data value from memory and transmitting the equalized data value to an internal test circuit of the semiconductor device.

21. The method of claim 20, comprising comparing the equalized data value with the data value in the internal test circuit.

22. The method of claim 21, comprising generating an indication indicative of the correct functioning of the decision feedback equalization of the semiconductor device based upon the comparison of the generated data value with the data value.

23. The method of claim 18, comprising transmitting the equalized data value to an internal test circuit of the semiconductor device.

24. The method of claim 23, comprising comparing the equalized data value with the data value and generating an indication indicative of the correct functioning of the decision feedback equalization of the semiconductor device based upon the comparison of the generated data value with the data value.

25. A memory testing device, comprising:
    a processor configured to:
      receive an indication of tap values to be applied by decision feedback circuitry of a memory device; and
      generate a modified data stream to mimic inter-symbol interference of a data stream correctable by the tap values; and
    an output configured to transmit the modified data stream as an input data stream to the memory device.

26. The memory testing device of claim 25, comprising an input configured to receive the indication of tap values from the memory device.

27. The memory testing device of claim 25, comprising an input configured to receive the indication of tap values from a user.

28. The memory testing device of claim 25, comprising an input configured to receive an output data stream from the memory device.

29. The memory testing device of claim 28, wherein the processor is configured to initiate comparison of the output data stream with the data stream to verify correction functioning of the decision feedback circuitry.

30. The memory testing device of claim 29, wherein the processor is configured to generate an indication of the comparison for display or for storage in the memory device or the memory testing device.

31. A tangible non-transitory computer-readable medium having computer executable code stored thereon, the code comprising instructions to cause a processor to:
   generate a data stream;
   transmit the data stream to a semiconductor device;
   receive a first output data stream from the semiconductor device, wherein the first output data stream comprises a decision feedback equalized data stream of the input data stream;
   generate a modified data stream to mimic inter-symbol interference of the data stream correctable by decision feedback equalization circuitry of the memory device; and
   receive a second output data stream from the semiconductor device, wherein the second output data stream comprises a decision feedback equalized data stream of the modified data stream.

32. The tangible non-transitory computer-readable medium of claim 31, wherein the code comprises instructions to generate a first data eye diagram based on the first output data stream.

33. The tangible non-transitory computer-readable medium of claim 32, wherein the code comprises instructions to generate a second data eye diagram based on the second output data stream.

34. The tangible non-transitory computer-readable medium of claim 33, wherein the code comprises instructions to generate an output of the first data eye diagram and the second data eye diagram to indicate whether the first data eye diagram matches the second data eye diagram.

* * * * *